United States Patent [19]

Laskaris et al.

[11] Patent Number: 5,411,100
[45] Date of Patent: *May 2, 1995

[54] COMPRESSED AIR FOAM SYSTEM

[75] Inventors: Michael A. Laskaris, Collegeville; Richard E. Teske, Norristown, both of Pa.

[73] Assignee: Hale Fire Pump Company, Conshohocken, Pa.

[*] Notice: The portion of the term of this patent subsequent to Oct. 26, 2010 has been disclaimed.

[21] Appl. No.: 88,863

[22] Filed: Jul. 8, 1993

Related U.S. Application Data

[63] Continuation-in-part of Ser. No. 955,322, Oct. 1, 1992, Pat. No. 5,255,747.

[51] Int. Cl.⁶ .................................................. A62C 35/00
[52] U.S. Cl. .................................... 169/14; 169/24
[58] Field of Search .................... 169/13, 14, 15, 24, 169/44

[56] References Cited

U.S. PATENT DOCUMENTS

| | | | |
|---|---|---|---|
| 2,146,605 | 2/1939 | Timpson | 169/15 |
| 2,183,561 | 12/1939 | Hamblin | 169/15 X |
| 2,769,500 | 11/1956 | Clifford | 169/15 |
| 2,936,835 | 5/1960 | Sheppard | 169/15 X |
| 3,811,660 | 5/1974 | Cole, Jr. | 169/15 X |
| 4,345,654 | 8/1982 | Carr | 169/14 X |
| 4,981,178 | 1/1991 | Bundy | 169/15 X |
| 5,031,834 | 7/1991 | Simpson | 169/15 X |
| 5,096,389 | 3/1992 | Grady | 169/14 X |
| 5,113,945 | 5/1992 | Cable | 169/14 X |
| 5,145,014 | 9/1992 | Eberhardt | 169/14 |
| 5,255,747 | 10/1993 | Teske et al. | 169/15 |

FOREIGN PATENT DOCUMENTS

| | | | |
|---|---|---|---|
| 589655 | 12/1959 | Canada | 169/14 |
| 901026 | 1/1954 | Germany | 169/15 |
| 936492 | 12/1955 | Germany | 169/15 |
| 51801 | 12/1941 | Netherlands | 169/15 |
| 239121 | 12/1945 | Switzerland | 169/44 |
| 228878 | 10/1968 | U.S.S.R. | 169/14 |

*Primary Examiner*—Andrew C. Pike
*Attorney, Agent, or Firm*—Frank A. Follmer

[57] ABSTRACT

A system supplies compressed air and foam to produce a fire stream comprising an aerated foam. The system includes a fire pump, an air compressor, a mixer, and a controller for automatically maintaining a desired ratio of air and water delivered from the mixer to a fire stream delivery device. An electronic control unit is arranged to sense both the flow rate of the water delivered by the fire pump and the air flow rate delivered by the air compressor, and modulates an air pressure signal used to vary the flow of air to the inlet of the air compressor so as to hold the air flow rate and the water flow rate at the desired ratio.

9 Claims, 4 Drawing Sheets

COMPRESSED AIR FOAM SYSTEM

This application is a continuation-in-part of application Ser. No. 07/955,322, filed Oct. 1, 1992, now U.S. Pat. No. 5,255,747.

FIELD OF THE INVENTION

This invention relates generally to foam supply systems for fire fighting applications, and, more particularly, to a system for supplying compressed air and foam to produce a fire stream comprising an aerated foam.

BACKGROUND OF THE INVENTION

Foam supply systems of the above-indicated type are known in the art by the term CAFS (Compressed Air Foam System) and WEPS (Water Expansion Pumping System). A typical system includes a foam injector system, a water pumping system, and an air system including an air compressor for supplying air under pressure. For example, when employing mixture ratios of 1 CFM of air to 1 GPM of water, these systems can produce very desirable results in fire fighting by the use of "Class A" or "Class B" foams to help achieve fire suppression and to deal with increased fire loads and related hazards.

With the present day systems of the indicated type it is difficult under fire fighting conditions to maintain the water pressure and the air pressure at desired levels. At a fire fighting scene, unless an operator is present at all times to observe the flow conditions and is skilled at operating the equipment to make the necessary adjustments thereof, it is possible for the system to run out of water, to run out of foam, to lose prime in the water pump, to mix air with water by itself without the foam concentrate, to put air into the system by itself, and to even overpressurize the air. The occurrence of any of the above events, in addition to the occurrence of other possible problems, can be hazardous to the firefighter.

Various types of foam fire extinguishing systems are known, such as the valve-controlled systems disclosed in the references cited in application Ser. No. 07/955,322, now U.S. Pat. No. 5,255,747. However, these systems do not disclose control means in accordance with the present invention to automatically maintain the air flow delivered by the compressor at a desired relation to the water flow delivered by the water pump.

SUMMARY OF THE INVENTION

It is the general object of the invention to provide a compressed air foam system for fire fighting applications designed to provide safe operation under all typical fire fighting conditions.

Another object of the invention is to provide a compressed air foam system which comprises control means to automatically maintain the air flow delivered by the compressor at a desired relation to the water flow delivered by the water pump.

Briefly stated, the above and other objects and features of the invention are achieved by the provision of a compressed air foam system comprising a fire pump for delivering water under pressure by way of a conduit means to a fire stream delivery means, a foam proportioner for delivering a foam concentrate solution to the water being delivered through the conduit means to the fire stream delivery means, an air compressor for delivering air at a delivery pressure to the water/foam liquid being delivered through the conduit means, and a control means for automatically maintaining a desired rate of air flow delivered by the air compressor, which air flow rate is maintained in a desired proportion to the rate of water flow delivered by the water pump. More specifically, the control means comprises an electronic control unit constructed and arranged to maintain a desired ratio of air flow to water flow as the water pressure is varied during the fire fighting operation. To this end, the electronic control unit is arranged to sense both the flow rate of the water delivered by the water pump and the air flow rate delivered by the air compressor and to modulate an air pressure signal used to vary the flow of air to the inlet of the air compressor so as to hold the air flow rate and water flow rate at the desired ratio.

In accordance with another feature of the invention there is provided a safety means so that the air flow cannot be introduced into the foam system unless the fire pump is delivering water and unless the foam proportioner is operative to introduce foam into the system. Briefly stated, this system comprises an interlock including a pressure switch for sensing the water pressure delivered by the pump and a means for sensing the operation of the foam proportioner.

In accordance with another feature of the invention, there is provided an air pressure relief valve means which is operative to close the air inlet flow to the compressor in response to the occurrence of an excessive pressure condition at the delivery side of the compressor.

In application Ser. No. 07/955,322, now U.S. Pat. No. 5,255,747, which has a common Assignee with this application, there is disclosed a compressed air foam system wherein an air control means is provided to automatically maintain the air pressure delivered by the air compressor at a desired relation to the water pressure delivered by the water pump. This system utilizes a venturi which is constructed and arranged to receive the flow of the mixture of water and foam concentrate and to receive the flow of the air which is delivered from the air compressor and to mix the same and deliver the mixture of compressed air and foam solution to the fire stream delivery means. While this is a very satisfactory system, a venturi has a limited range. In accordance with the present system, the venturi is replaced by the electronic control unit whereby a simpler flow combining means comprising a simple tee connection may be used.

DETAILED DESCRIPTION OF THE PREFERRED EMBODIMENT

Figure 1:
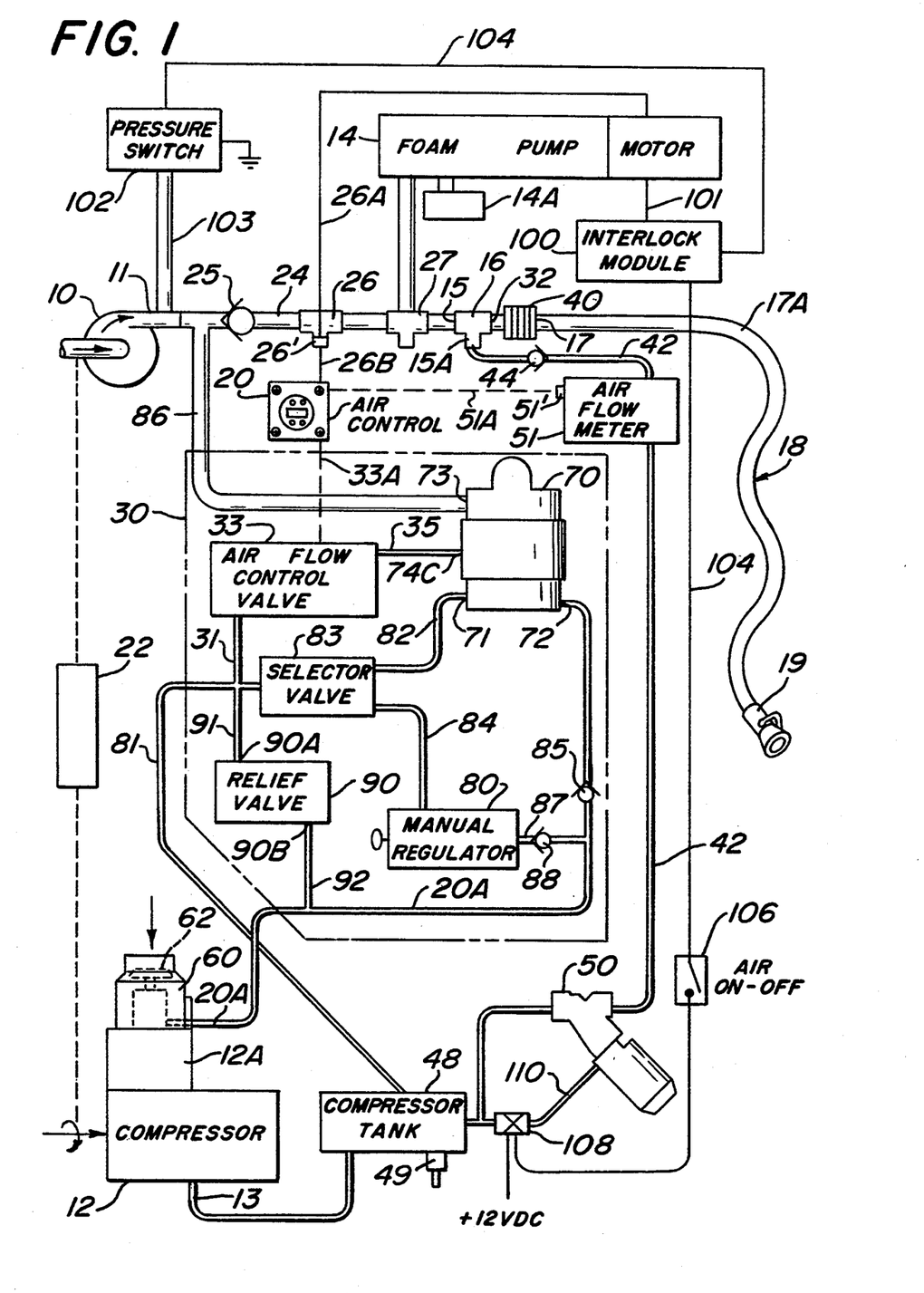
FIG. 1 is a schematic view of a compressed air foam system in accordance with the invention.

The main components of the compressed air foam system of the invention are a fire pump 10, an air compressor 12, a foam proportioner 14, an air injection means 16, a mixer 40, a fire stream delivery means 18, an electronic control unit 20, and an air control means 30 for regulating the flow rate of the air supplied to the air injection means 16.

Fire pump 10 is a suitable water pump which delivers water under pressure from a discharge 11 thereof. Fire pump 10 may comprise, by way of example, a QG 150 midship pump manufactured by Hale Fire Pump Company, said pump being a two-stage centrifugal pump which has impellers mounted on a rotating drive shaft.

Air compressor 12 is preferably a sliding-vane type of rotary compressor of a conventional construction and comprises a rotating drive shaft. By way of example, compressor 12 is constructed to operate at up to 400 cubic feet per minute. The drive for compressor 12 may include a clutch means which can be disengaged when it is desired to prevent operation of the compressor 12.

A transmission means 22 of the type disclosed in U.S. Pat. No. 5,145,014 is provided to cause rotation of the drive shafts of both the fire pump 10 and compressor 12 from the transmission on the fire truck. As is described in said patent, transmission means 22 includes a split shaft gearbox arranged to cause rotation of the drive shafts of the fire pump 12 and compressor 12 whereby said shafts are caused to rotate at a set proportional speed.

There is provided a water supply conduit means 24 for delivering water under pressure from the pump discharge 11 to the inlet 15 of the air injection means 16. Such means comprises a flow line extending between discharge 11 of fire pump 10 and the inlet 15 of air injection means 16 and having connected therein, in the direction of flow, a check valve 25, a water flowmeter 26, and a foam injector 27. Check valve 25 is constructed and arranged to permit flow in the direction from discharge 11 to the inlet 15 of the air injection means 16 and block flow in the opposite direction. Water flowmeter 26 and foam injector 27 are connected as part of the flow proportioner 14 as will be described hereafter. By way of example, flowmeter 26 may comprise the Hale/FoamPro Paddlewheel flowmeter manufactured by Hypro Corporation of New Brighton, Minn. Flowmeter 26 comprises a control means 26' which transmits an electrical signal corresponding to the rate of water flow therethrough.

Flow proportioner 14 may be of any suitable type well known in the art, such as that used in the FoamPro 2001 series electronic injection automatic foam proportioning system manufactured by Hypro Corporation of New Brighton, Minn. In this type of system, foam proportioner 14 is constructed to comprise a foam concentrate pump and a motor for driving the pump, as is shown in FIG. 1. This type of system operates to monitor the water flow through the water flowmeter 26. In operation, in response to an electrical signal transmitted from control means 26' via electrical line 26A to the flow proportioner motor, the amount of the foam concentrate delivered from a foam concentrate supply tank 14A to conduit means 24 through the foam injector 27 is controlled to be at a specified injection rate pursuant to the setting of the system. In order to protect the pump and motor of the foam proportioner system, there is typically provided an arrangement whereby the pump is interlocked with a foam concentrate supply tank float switch so that if the tank 14A is empty, said pump will not run.

As best shown in FIG. 1, air injection means 16 comprises a tee connection having an inlet 15, which is connected to the downstream end of the conduit means 24 as shown in FIG. 1, and an outlet 32 which is connected to direct the flow from the air injection means 16 into a mixer 40. The mixer 40 is connected at its downstream end to the upstream end 17 of the fire hose 17A of the fire stream delivery means 18 as is shown in FIG. 1. Air injection means 16 also comprises an inlet portion 15A providing an air inlet for receiving air flow delivered from air compressor 12 as will be described hereafter.

Mixer 40 is an improved type of motionless mixer which is described in application Ser. No. 08/076,586 filed Jun. 14, 1993. Briefly, mixer 40 comprises a plurality of flanges which are provided with fingers to create turbulence without losing much pressure as the mixture of foam solution and air flows from the air injection means 16 to the upstream end 17 of the fire stream delivery means 18. Mixers of this type are known in the art as motionless or stationary mixers and function to enhance mixing by adding turbulence to the flow while keeping the pressure loss to a minimum.

The fire stream delivery means 18 can take various forms, such as a deck gun or one or more fire hoses with nozzles at the end thereof. In FIG. 1, the fire stream delivery means 18 is shown as a single fire hose 17A having a nozzle 19 at the end thereof.

There is provided an air conduit means 42 for delivering air to the air inlet portion 15A of air injection means 16. Such conduit means 42 comprises a flow line having its downstream end connected to air inlet portion 15A of the air injection means 16. The flow line forming the air conduit means 42 has a check valve 44 connected therein constructed and arranged to permit flow therethrough into the air injection means 16 by way of portion 15A and to prevent flow in the opposite direction. The flow line forming the air conduit means 42 also has a control valve 50 connected therein for controlling flow therethrough, and an air flowmeter 51 connected therein for measuring flow therethrough. The control valve 50 is actuatable between open and closed positions in a manner to be described more fully hereafter. Air flowmeter 51 may be of any suitable type such as the Hale SCFM Air Flowmeter manufactured by Hale Fire Pump Company. Flowmeter 51 has a control means 51' which transmits an electrical signal corresponding to the rate of air flow therethrough, said signal being sent to electronic control unit 20 via electrical line 51A.

The air compressor 12 is arranged to deliver air at a delivery pressure to the upstream end of air conduit means 42. To this end, the discharge 13 of compressor 12 is connected to a compressor tank 48 which provides a supply of compressed air at the compressor discharge pressure. The upstream end of air conduit means 42 is connected to the compressor tank 48 to receive a supply of air at the compressor discharge pressure whereby conduit means 42 delivers said air to inlet portion 15A of the air injection means 16 through the control valve 50, the air flow meter 51, and the check valve 44.

Air is supplied to compressor 12 through an inlet 12A. An inlet throttling valve means 60 is constructed and arranged for varying the flow of air to the inlet 12A of compressor 12 to thereby control the compressor discharge pressure. In order to control the compressor discharge pressure, the inlet throttling valve 60 is provided with a control valve member 62 which cooperates with a valve seat 64 to vary the amount of the air flow to the compressor inlet 12A in response to a pilot or control air pressure directed to a flow control chamber as will be described hereafter. The control valve member 62 is constructed and arranged to be positioned relative to valve seat 64 to control the amount of air entering the air compressor 12 through inlet 12A until the compressor discharge pressure provides an air flow through line 42 that matches a desired set value of the system as will be described hereafter.

Figure 4:
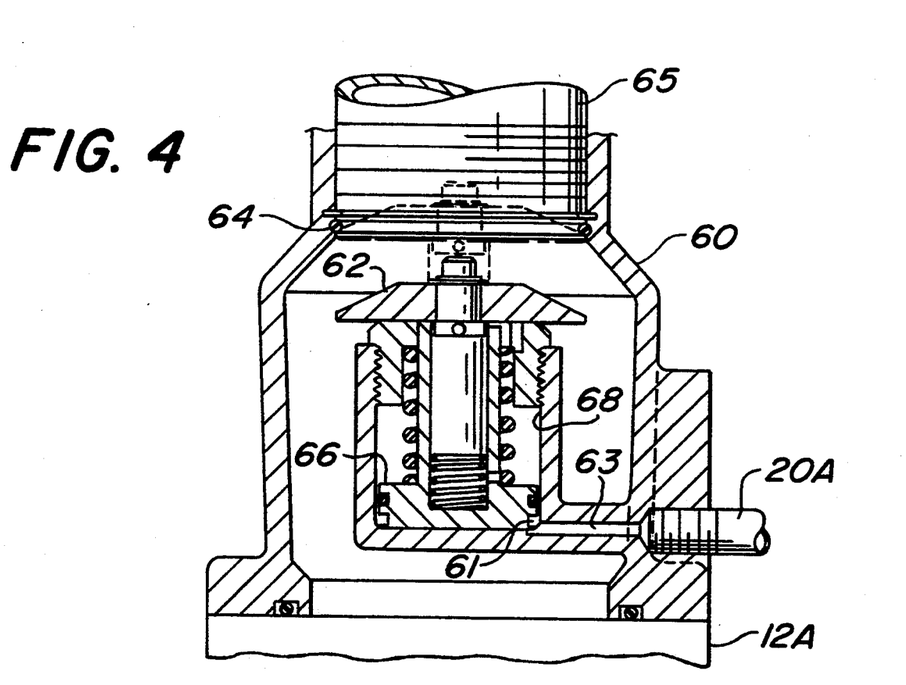
FIG. 4 is a sectional view of an inlet throttling valve means for the air compressor used in the system shown in FIG. 1.

The inlet throttling valve 60 is of a type well known in the art and is shown in detail in FIG. 4. As shown in FIG. 4, the inlet throttling valve 60 comprises control valve member 62 which is mounted for movement with a control piston 66 guided for movement in a cylinder 68 which defines a control chamber 61 at the one (lower) side of the control piston 66. The pilot or control pressure is delivered to the control chamber 61 by way of a passage 63 formed in the body of valve 60, the upstream end of passage 63 being in flow communication with a flow line 20A communicating therewith and mounted in the side of the body of valve 60 as shown in FIG. 4. Flow line 20A delivers the pilot or control air pressure to valve 60 so that it, in effect, controls or modulates the compressor discharge pressure. The control valve member 62 cooperates with valve seat 64 and moves between the solid line (or fully opened) position shown in FIG. 4 and a closed position as shown in dotted lines in FIG. 4. The upstream side of the valve seat 64 is connected to atmosphere by a inlet tube 65 as is conventional in the art.

Flow line 20A, which delivers the pilot or control air pressure to valve 60 in order to control or modulate the compressor discharge pressure, is part of an air control means 30 which is constructed and arranged to regulate the air pressure in flow line 20A. In accordance with the invention, this control is performed in response to control signals from the electronic control unit 20 as will be described hereafter. To this end, air control means 30 comprises a pilot operated air regulator 70 having an air inlet 71, a pilot air inlet 74C, and an air outlet 72. A conduit means, comprising a pair of flow lines 81 and 82 and a selector valve 83, is constructed and arranged for communicating the compressor discharge pressure to air inlet 71 of regulator 70. Flow line 81 is connected between compressor tank 48 and the inlet of selector valve 83. Flow line 82 is connected between an outlet of selector valve 83 and air inlet 71 of regulator 70. Selector valve 83 can be set to a first selecting position wherein flow line 81 is in flow communication with flow line 82 and a second selecting position wherein flow line 81 is in flow communication with a flow line 84 which is connected to the inlet of a manual regulator 80 for a purpose to be described hereafter.

A pilot air conduit means, comprising an air flow control valve 33, a line 31 connected between flow line 81 and the inlet or supply port of valve 33, and a line 35 connected between the outlet port of valve 33 and pilot air inlet 74C of regulator 70, is constructed and arranged for delivering a controlled air pressure to the pilot air inlet 74C of regulator 70. Air flow control valve 33 is controlled by electronic control unit 20 to deliver a controlled air pressure to pilot air inlet 74C, as will be described hereafter.

A conduit means, comprising flow line 20A, is constructed and arranged for communicating the air outlet 72 of regulator 70 with the passage 63 leading to control chamber 61 of inlet throttling valve 60. Flow line 20A has a check valve 85 connected therein constructed and arranged to provide flow in the direction from air outlet 72 to inlet throttling valve 60 and to block flow in the opposite direction.

A conduit means, comprising a flow line 86, is constructed and arranged for communicating the water supply conduit means 24 to the water inlet 73 of regulator 70. To this end, flow line 86 is connected to the water conduit means 24 at a location immediately adjacent the compressor discharge 11 and has its downstream end connected to water inlet 73 of regulator 70.

Regulator 70 is constructed and arranged to vary the pressure of the air communicated by flow line 20A to the control chamber 61 of inlet throttling valve 60 in response to the pressure delivered to pilot air inlet 74C of pressure regulator 70 (which pressure is controlled by air control valve 33 under the control of electronic control unit 20, which monitors the rate of air flow through flowmeter 51 and the rate of water flow through flowmeter 26) to automatically maintain the flow rate of air through flow line 42 at a desired relationship relative to the flow rate of water through conduit 24.

Figure 2:
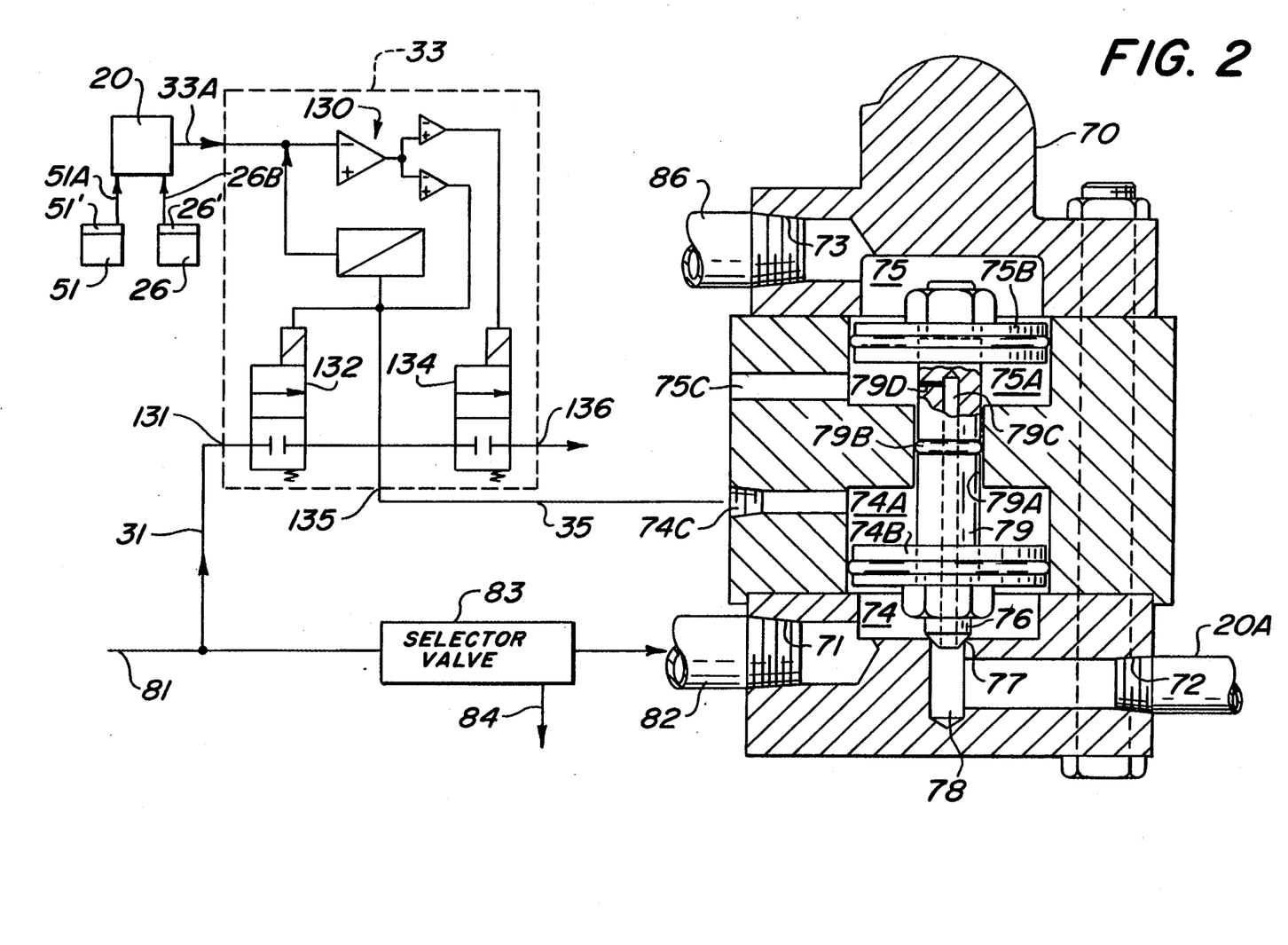
FIG. 2 is a sectional view of an air pressure regulator and electric control valve used in the system shown in FIG. 1.

The above-described function of the regulator 70 is achieved by a construction shown in detail in FIG. 2. Regulator 70 comprises an air control chamber 74, which is arranged to receive the flow of air through air inlet 71, a pilot air control chamber 74A, which is arranged to receive the flow of air through pilot air inlet 74C, and a water control chamber 75, which is arranged to receive the flow of water through the water inlet 73. By this construction, the air pressure in control chamber 74 is at the compressor discharge pressure, the air pressure in pilot air control chamber 74A is set by air flow control valve 33, and the water pressure in chamber 75 is at the fire pump delivery pressure.

A control valve member 76 is arranged to cooperate with a valve seat 77 to regulate the flow of air from the chamber 74 through a passage 78 to the air outlet 72 and flow line 20A. Valve member 76 is mounted on the lower end of a valve stem 79 which is guided for movement in a bore 79A in the body of regulator 70 such that valve member 76 moves toward and away from valve seat 77 to regulate the flow of air from air control chamber 74 to the flow line 20A by way of passage 78 and air outlet 72, said air flow being the control air which is delivered to the inlet throttling valve 60 to control the operation thereof.

Means are provided to make valve stem 79 responsive to the pressures in control chambers 74, 74A, and 75. To this end, there is provided a piston 74B, which is connected to valve stem 79 and is responsive to the pressure in air control chambers 74 and 74A, and a piston 75B, which is connected to the upper end of valve stem 79 and is responsive to the water pressure in water control chamber 75, as is apparent from a consideration of FIG. 2.

As shown in FIG. 2, pilot air control chamber 74A is located on the side of piston 74B opposite control chamber 74 and receives air under pressure from the air signal line 35 of air flow control valve 33. There is also provided a chamber 75A located on the side of piston 75B opposite control chamber 75 and a passage 75C for venting chamber 75A to atmosphere. There is provided an O-ring seal 79B between valve stem 79 and bore 79A to provide a seal between the air in chambers 74A and 75A. There is also provided passages 79C and 79D in valve stem 79 which function as means for venting to atmosphere the control air delivered to inlet throttling valve 60 by the conduit means comprising passage 78, air outlet 72, and flow line 20A. Passage 79C is formed by an axial drilled hole which communicates at its lower end with chamber 74 and at its upper end with passage 79D as shown in FIG. 2. Passage 79D is formed by a small diameter radial drilled hole which communicates at its outer end with chamber 75A (which is vented to atmosphere by passage 75C) and which communicates at its inner end with the upper end of passage 79C. Passage 79D provides an orifice whose size determines the rate at which air is vented (or bled) from the above-described conduit means that delivers the control air to inlet throttling valve 60. Typically, passage 79D is about 1/32 inch in diameter.

By reason of the above-described construction and arrangement, the air regulating system is a constant flow-through system and inherently functions with a throttling action as air flows through the air regulator 70 past valve seat 77 under the control of valve member 76 to change the net air pressure seen in the flow line 20A, which pressure is delivered to the inlet throttling valve 60 as discussed above. The air that flows to line 20A from air regulator 70 is decreased by being vented to atmosphere through the orifice passage 79D, the inner end of which communicates with passage 78. This air pressure vents to the exterior atmosphere by way of chamber 75A and passage 75C as discussed above. This venting action allows the system to be a flow-through system so that when the valve member 76 moves closer to valve seat 77 to reduce, or even shut off, the air flow between chamber 74 and passage 78 at the upstream end of flow line 20A, the air in line 20A will decrease at a slow rate determined by the size of orifice passage 79D. This type of action continues as the valve member 76 moves toward and away from valve seat 77 in a throttling action.

In the operation of the air regulator 70, what occurs is that valve member 76 throttles and is moved toward and away from valve seat 77 to maintain various intermediate positions relative thereto somewhere between a fully closed and a fully open position as more or less air pressure is required. More specifically, as more or less air pressure is required by the control function of the system, the air pressure regulator valve member 76 will close a certain amount, not necessarily to a fully closed position, to reduce the air outlet pressure, or valve member 76 will open an additional amount to increase the air outlet pressure, which air pressure is delivered through passage 78 and air outlet 72 to flow line 20A. Thus, the system inherently throttles by bleeding off through passages 79C and 79D air pressure that would normally be in line 20A.

Piston 75B and its bore have a slightly smaller bore diameter than piston 74B and its bore, the difference in these diameters being about 1/32 inch in a typical installation. The piston sizing is such that when no air is supplied to pilot air control chamber 74A through air control valve 33, equal air and water pressures in chambers 74 and 75 acting on pistons 74B and 75B, respectively, will cause valve member 76 to move to an open position, which is a standby control position, whereby high control pressure air will be communicated from chamber 74 past valve seat 77 to air outlet 72 from which the high pressure air will be delivered to control chamber 61 of inlet throttling valve 60 causing its valve member 62 to move to the closed position (to shut off the flow of air to compressor inlet 12A) shown in dashed lines in FIG. 4. This causes a reduction in the compressor output pressure delivered to chamber 74 to an air pressure less that 1 psig below the water pressure delivered to chamber 75, whereupon valve member 76 is moved to its closed position (shown in FIG. 2) to lower the air control pressure delivered to valve 60. By this construction, the system air pressure is maintained at less than 1 psig below the system water pressure. This is a "fail safe" means so that if the electronics fail, no excessive air flow could occur.

The electronic control unit 20 can cause additional air to flow by increasing compressor discharge air pressure. This is done by sending a signal from the electronic control unit 20 through line 33A to air control valve 33 so that valve 33 opens sending a controlled pressure signal to chamber 74A which will act on piston 74B to close valve member 76. This lowers the control pressure output in air outlet 72 which is connected via line 20A to inlet throttling valve 60 as discussed above. The lower control pressure allows valve 60 to open due to reduced pressure in control chamber 61 acting on piston 66. Thus, more air flows into compressor 12 and the air flow into line 42 is increased and controlled by the system, said air being injected into the water flow at the air injecting means 16. This condition can be changed by the application of a pilot control air supply to the chamber 74A by air control valve 33 under the control of the electronic control unit 20 in accordance with the air flow through flowmeter 51 and the water flow through flowmeter 26 which is sensed by the unit 20 as will be described hereafter.

Electronic control unit 20 is a programmable microprocessor and, therefore, is versatile and easy to use. The microprocessor is provided with two sensor inputs which receives input control signals through the electrical lines 51A and 26B which transmit electrical signals from the control means 51' and 26' of the flowmeters 51 and 26, respectively. The microprocessor forming electronic control unit 20 has one user set variable, namely, air/water ratio, and one output, namely the connection to electric air control valve 33 by way of the electrical line 33A.

In operation, the microprocessor forming electronic control unit 20 acts as a comparator/controller. The water flow signal is received from flowmeter 26 and multiplied by the user set air/water ratio. This total value is compared to the air flow signal received from the air flowmeter 51 and the output signal through line 33A is changed accordingly for more or reduced air flow. Thus, the electronic control unit 20 is a basic "closed loop" controller, and is preferably made of a microprocessor construction so that the update rates from the flowmeters 26 and 51 and out to the air control valve 33 can be adjusted to prevent hunting. For example, the update rate (or rate that the electronic control unit 20 "looks" at a value) for the flowmeters 26 and 51 would typically be three times the update rate for the output to the air control valve 33. The software for the microprocessor is then made to have three data points to check for a trend off nominal before changing the output. This is pursuant to standard controller technology and a programmable process controller such as those manufactured by Micro-Mint Corporation is suitable for use.

Referring to FIG. 2, the air flow control valve 33 is an electrically controlled valve of a well known type constructed to receive an electric control signal from the electronic control unit 20 to vary the air pressure delivered to the pilot control chamber 74A to thereby vary the movement of the valve member 76 toward and away from the valve seat 77 to vary the air supply through line 20A. While various types of electrically controlled air control valves may be used as valve 33, one suitable valve is the Model SPC1R of Buzmatics Corporation of Indianapolis, Ind. This valve, which is shown schematically in FIG. 2, comprises solid state electronics, indicated generally at 130, an intake valve 132, an exhaust valve 134, a relieving pressure exhaust port 136, an air supply pressure port 131, and a controlled pressure output "work port" 135. In operation, when a set point command signal is applied to the input electrical line 33A from electronic control unit 20, the solid state electronics 130 compare the pressure present at the pressure output work port 135 to the pressure required by the command signal. If the command signal is higher than the pressure present, then the electronics sends a signal to the intake valve 132, opening the intake valve 132 and increasing the pressure in the output work port 135. If the command signal is lower than the pressure in the output work port 135, then the electronics sends a signal to the exhaust valve 134 opening it and thereby decreasing the pressure in the output work port 135. As stated above, valves of this type are well known in the art and operate as briefly described above to receive a electrical signal and deliver a controlled pressure output.

In the operation of the air pressure regulator 70, when the water pressure in chamber 75 and the air pressure in chamber 74 are balanced, valve stem 79 positions valve member 76 to be unseated from valve seat 77 a proper distance determined by the pressure in pilot control chamber 74A (under the control of air control valve 33) to allow the proper control pressure to be delivered through flow line 20A to the inlet throttling valve 60. This control pressure in line 20A will cause the throttling valve 60 to provide the proper flow to the compressor inlet 12A so that compressor 12 maintains the proper air discharge pressure that is desired.

Manual regulator 80 is of any conventional type well known in the art and comprises a control valve member which is connected to a pressure responsive diaphragm which is responsive to the pressure in a control chamber connected to the downstream end of flow line 84. Regulator 80 is adjusted manually by a handle which adjusts a spring to maintain a desired pressure on the diaphragm in a direction opposite to the air pressure applied to the diaphragm in the control chamber. In use, the manual regulator 80 is set by the operator to that pressure of the system which will balance the water pressure. However, as was stated above, the water pressure can vary widely during fire fighting operations by reason of the varying conditions at the fire stream delivery means. The outlet of the manual regulator is delivered through a flow line 87 having a check valve 88 therein to the flow line 20A whereby the pressure delivered through manual regulator 80 can be used to control the compressor discharge pressure by way of the inlet throttling valve 60 as discussed above. Manual regulator 80 is used as a back up to the automatic air control means 30 and is selected for use by positioning the selector valve 83 to connect flow lines 81 and 84 as discussed above.

Compressor tank 48 is provided with a conventional pressure relief valve 49 which prevents the system from being subjected to a high pressure which could cause damage to the components thereof. By way of example, relief valve 49 is set to open the compressor tank 24 to atmosphere when the pressure in the tank 48 reaches a pressure of 200 PSI. In accordance with the invention, air control means 30 is provided with a relief valve means comprising a relief valve 90 and a pair of flow lines 91 an 92. Flow line 91 is connected between flow line 81 and an inlet 90A to relief valve 90. Flow line 92 is connected between a relief discharge 90B of relief valve 90 and flow line 20A which delivers the pilot or control pressure to the inlet throttling valve 60. The pressure relief valve means of the air control means 30 is constructed and arranged to deliver a pressure signal through the relief discharge 90B thereof (and flow line 20A) to the inlet throttling valve 60 to close the same and block inlet flow to the compressor 12 to thereby maintain the air pressure in the system. The relief valve 90 is set to operate at a lower relief pressure than relief valve 49, such as for example, at 180 PSI as compared with 200 PSI for relief valve 49. An important advantage of the relief valve means described above over the standard type of relief valve, such as relief valve 49, which dumps air from the compressor discharge or receiver tank 48, is that the standard type of relief valve will also dump lubricating oil from said tank. This requires the attention of the operator to refill the lost oil before continuing operation.

Figure 5:
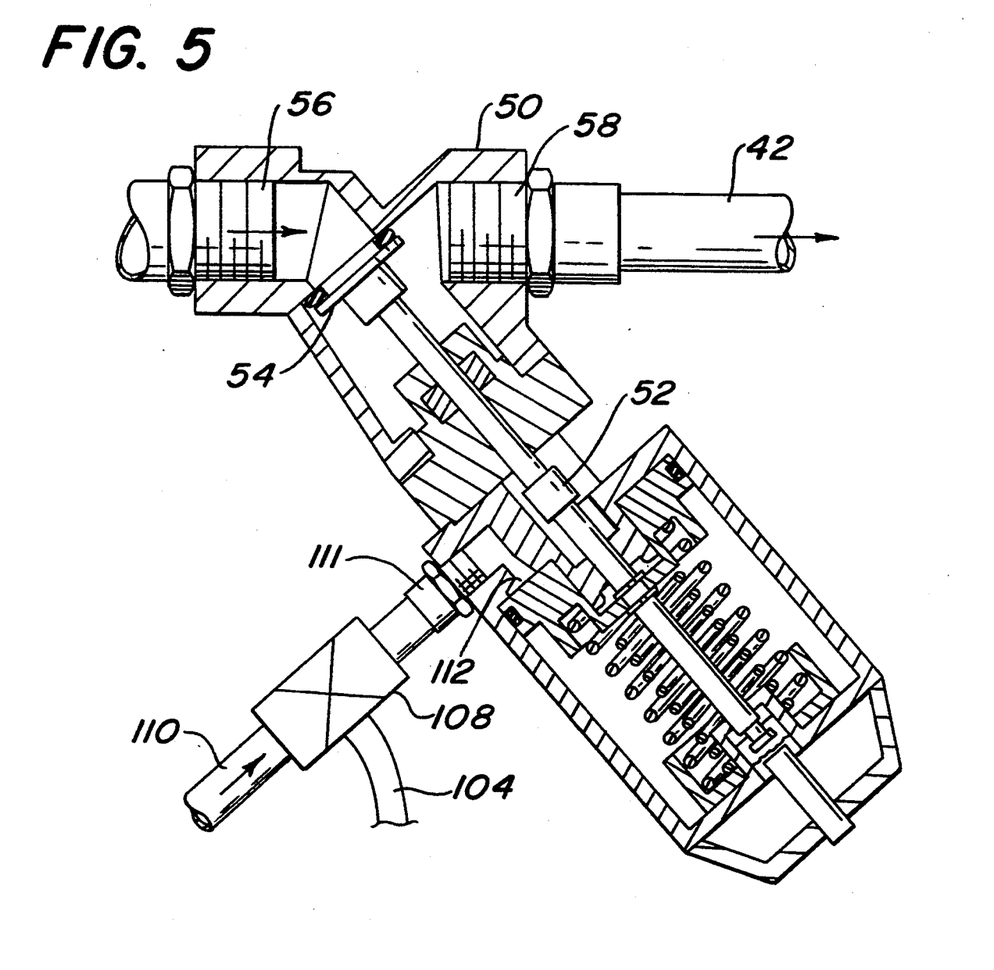
FIG. 5 is a sectional view of an air flow control valve means used in the system shown in FIG. 1.

In accordance with another feature of the invention there is provided a safety means so that the air flow cannot be introduced into the air injection means 16 unless two things occur, namely, (1) the fire pump is delivering water to conduit means 24 and (2) the foam proportioner 14 is operative to introduce foam into the system. This safety means comprises an electrical circuit means including a conventional interlock 100 which includes an electrical relay switch connected in series with pressure switch 102. Pressure switch 102 is arranged to sense the water pressure at the water pump discharge 11 by means of a line 103 and closes the circuit when fire pump 10 is operative to deliver water to conduit means 24. The relay switch of interlock 100 is controlled by a relay circuit which includes a line 101 which senses that the motor of the pump of foam proportioner 14 is operating and is arranged to close this relay switch. When both the relay switch of the interlock 100 and the pressure switch 102 are closed, a circuit is completed through the electrical line 104 which includes a manual air ON-OFF switch 106 and a solenoid coil of a solenoid operated flow control valve 108. The parts are constructed and arranged so that when both the pressure switch 102 and the relay switch of the interlock 100 are closed, and when air ON-OFF switch 106 is closed, a electrical circuit passes through the solenoid coil of the solenoid operated control valve 108 to actuate the same to an open position which allows air to flow from the compressor tank 48 through a flow line 110 to a control chamber 112 of flow control valve 50. Flow line 110 directs the pilot air flow to valve 50 to effect opening thereof when there is air pressure in tank 48, and, as shown in FIGS. 1 and 5, flow line 110 is connected between tank 48 and the inlet 111 to control chamber 112. Valve 50 is a conventional air pilot-operated valve provided with a normally closed solenoid valve 108 and may be, for example, a Series 211–212 valve provided with a Series 885 signal box and a Series 107 solenoid valve (normally closed), all manufactured by ASCO Pneumatic Controls Co., Joucomatic Division. Valve 50 is shown in detail in FIG. 5 and, as is conventional, comprises a piston-actuated valve stem 52 which carries a valve member 54 which controls the air flow between an inlet 56 and an outlet 58. As shown in FIG. 5, valve 50 is connected to control the flow through conduit 42, which is connected between the compressor tank 48 and the tee branch 15A of the air injection means 16 as described above.

Figure 3:
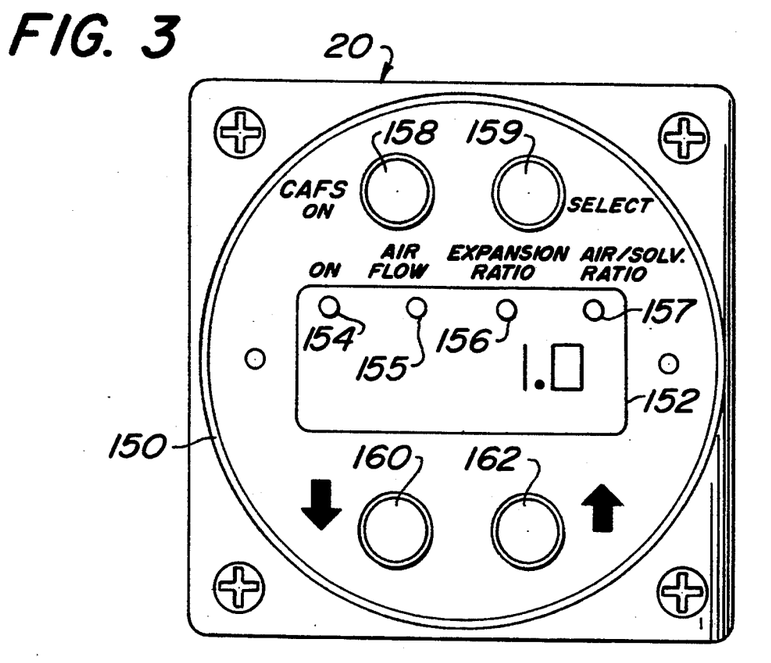
FIG. 3 is a view of the control module for the electronic control unit.

In the use of the compressed air foam system in accordance with the invention, when the selector valve 83 is set to the selector position wherein the pressure in compressor tank 48 is delivered through flow lines 81 and 82 to the air inlet 71 of regulator 70, the system will operate to automatically maintain the air flow rate delivered by the compressor 12 at a desired relationship with the water flow rate delivered by the water pump 10. This system is controlled by means of a control module 150 shown in FIG. 3 which is mounted on the electronic control unit 20. Control module 150 comprises a display 152 which can show either the air flow rate, the foam expansion ratio, or the air/foam solution ratio. The function being displayed is indicated by function indicator lights 154–157 as shown in FIG. 3. Control module 150 also comprises a button 158 to engage this system and a button 159 to select the function to be viewed on the display 152 to either view the air flow, the foam expansion ratio, or the air/foam solution ratio. Control module 150 also comprises a pair of buttons 160 and 162 to change the air flow rate by increasing or decreasing the same as shown by the arrows adjacent buttons 160 and 162 in FIG. 3.

In use, once the air/solution ratio is set at the control module 150, electronic control unit 20 operates to send a command signal through electrical line 33A to the electrical input of air control valve 33, which valve functions to control the output pressure delivered through line 35 to pilot chamber 74A of regulator 70. This pilot air control pressure in chamber 74A functions to position valve member 76 so that the proper air pressure is delivered through control line 20A to the inlet throttling valve 60 so that this valve 60 controls the compressor 12 to produce the desired air flow through line 42 to the air injection means 16. Thus, when electronic control unit 20 determines that more air is required, it signals air control valve 33 to add more air pressure to chamber 74A of regulator 70 which lowers the outlet pressure in line 20A whereby control valve 62 of inlet throttling valve 60 opens farther to cause more air to flow through line 42 to air injection means 16. Accordingly, the desired ratio of the air flow rate to the water flow rate is automatically maintained during the fire fighting operation by the compressed air foam system in accordance with the invention as described in detail hereinbefore. A dampening action to the operation of regulator 70 is achieved by the air trapped in chamber 74A by the arrangement of air control valve 33 feeding pressure to chamber 74A by way of air inlet 74C.

It will be noted that the air pressure regulator 70 operates, in a standby function, to control (match) air pressure to water pressure when no air flow is required by the control function of the electronic control unit 20. When air flow is required, the electronic control unit 20 operates to override the standby function of air pressure regulator 70 and automatically cause the delivering of the required air flow in the manner as described above. However, the air pressure regulator 70 provides a back-up if the electronic control unit 20 should fail for some reason and, in that event, regulator 70 functions to control the system pressure. This standby function of air pressure regulator 70 is important so that the static air pressure matches the static water pump pressure and the torque loads are consistent without spikes as air flow delivery is begun. Additionally, when no water is flowing, no air is flowing to pilot air control chamber 74A due to the electronic control being essentially in a standby mode and the mechanical automatic pressure regulator 70 keeps air and water pressures virtually equal. This is important so that extra air or water does not "pack" into the hose line causing unwanted surges upon opening the nozzle.

Another reason to utilize an air pressure regulator such as the pilot operated air regulator 70 is that because of the large air flows involved in a system such as a compressed air foam system, such as 90 SCFM minimum capacity, such a system cannot be directly controlled with electric valves.

What is claimed is:

1. A system for supplying compressed air and foam solution to produce a fire stream comprising an aerated foam, said system comprising a mixing means having a foam solution inlet, a discharge, and an air inlet, a fire stream delivery means constructed and arranged to receive fluid flow from the discharge of said mixing means, a fire pump for delivering water under pressure from a discharge thereof, a water supply conduit means for delivering water from the discharge of said pump to the foam solution inlet of said mixing means, water flow sensing means for sensing a flow rate of the water flowing through said water supply conduit means, a foam proportioner for delivering foam chemical into the water delivered by said water supply conduit means for making the foam solution, air conduit means for delivering the air to said air inlet of said mixing means, air flow sensing means for sensing a flow rate of the air flowing through said air conduit means, an air compressor for delivering the air at a discharge pressure to said air conduit means, said compressor having an inlet and a discharge, an inlet throttling valve means for varying a flow of air to said compressor inlet to thereby control the compressor discharge pressure, said inlet throttling valve means having a control chamber and a valve member responsive to pressure in said control chamber for varying the flow of air to said compressor inlet, and air flow control means for regulating the pressure of the air supplied to said control chamber of said inlet throttling valve means in accordance with the flow rate of the water sensed by said water flow sensing means and the flow rate of the air sensed by said air flow sensing means to automatically maintain the said flow rate of the air at a desired relationship to said flow rate of the water.

2. A system for supplying compressed air and foam solution to produce a fire stream comprising an aerated foam, said system comprising means for mixing the air and the foam solution having a foam solution inlet, a discharge, and an air inlet, a fire stream delivery means constructed and arranged to receive fluid flow from the discharge of said mixing means, a fire pump means for delivering water under pressure from a discharge thereof, a water supply conduit means for delivering the water from the discharge of said pump means to the foam solution inlet of said mixing means, a foam proportioner for delivering foam chemical into the water delivered by said water supply conduit means for making the foam solution, air conduit means for delivering the air to said air inlet of said mixing means, an air compressor for delivering the air at a discharge pressure to said air conduit means, said compressor having an inlet and a discharge, and control means for automatically maintaining a set ratio of air flow to water flow to said mixing means including an inlet throttling valve means for varying a flow of air to said compressor inlet to thereby control a compressor discharge air flow rate, said inlet throttling valve means having a control chamber and a valve member responsive to pressure in said control chamber for varying the flow of air to said compressor inlet, air control means for regulating the pressure of the air supplied to said control chamber of said inlet throttling valve means including an air pressure regulator means having an air inlet means, an air outlet means, and a control means for varying an air outlet pressure of said air pressure regulator means, a first conduit means for communicating the compressor discharge pressure to said air inlet means of said air pressure regulator means, and a second conduit means for communicating the air outlet pressure of said air pressure regulator means to said control chamber of said inlet throttling valve means, and an electronic control unit for delivering control signals to said control means of said air pressure regulator means to vary the outlet pressure thereof, said air control means being constructed and arranged to vary the pressure of the air communicated by said second conduit means to said control chamber of said inlet throttling valve means to regulate the flow rate of the air delivered to said air inlet of said mixing means in accordance with the flow rate of the water delivered by said fire pump means to automatically maintain the rates of air flow and water flow to said mixing means at a desired relationship.

3. A system according to claim 2 comprising a pressure relief valve means having an inlet and a relief discharge, and conduit means for connecting the inlet of said pressure relief valve means to sense the discharge pressure of said air compressor and conduit means for connecting the discharge of said pressure relief valve means to said second conduit means connected to said control chamber of said inlet throttling valve means, said pressure relief valve means being constructed and arranged to deliver a pressure through said relief discharge thereof and said second conduit means connected to said inlet throttling valve means to close the same and block inlet flow to the compressor to thereby maintain the air pressure in the system at a desired pressure.

4. A system according to claim 2 comprising an air safety interlock means including an air control valve for controlling flow through said air conduit means and being actuatable between a closed position blocking flow through said air conduit means and an open position permitting flow through said air conduit means, and means for actuating said air control valve from said closed position to said open position in response to the sensing of the operation of both said fire pump means to deliver the water under pressure to the discharge thereof and said foam proportioner to deliver the foam chemical to said water supply conduit means.

5. A system according to claim 2 wherein said air pressure regulator means includes an air pressure regulator comprising a regulator air inlet, a regulator air outlet, a regulator water inlet, a regulator pilot air inlet, a regulator valve member operable for controlling the flow of air from said regulator air inlet to said regulator air outlet, a valve stem operatively connected to said regulator valve member for causing movement thereof, an air pressure responsive means operatively connected to said valve stem, a water pressure responsive means operatively connected to said valve stem, said water pressure responsive means being responsive to the pressure of the water delivered to said air pressure regulator through said regulator water inlet to actuate said valve stem in a first direction, said air pressure responsive means being responsive to the pressure of the air delivered to said air pressure regulator through said regulator air inlet for actuating said valve stem in a second direction opposite to said first direction, and a pilot air pressure responsive means operatively connected to said valve stem and constructed and arranged to be responsive to the air pressure delivered to said air pressure regulator through said regulator pilot air inlet to actuate said valve stem to cause movement of said regulator valve member.

6. A system according to claim 5 including a manual air pressure regulator having an inlet and an outlet and constructed and arranged to be manually set at a manual setting for regulating the pressure of the air supplied to said control chamber of said inlet throttling valve means in accordance with said manual setting, and selector valve means for communicating the compressor discharge pressure from said first conduit means to said inlet of said manual pressure regulator or to said regulator air inlet of said air pressure regulator of said air pressure regulator means.

7. A system according to claim 5 wherein said air pressure regulator means includes a pilot air flow control valve for controlling the air pressure delivered to said regulator pilot air inlet.

8. A system according to claim 5 wherein said air pressure regulator means is constructed and arranged to position said regulator valve member to a standby control position when no air pressure is delivered through said regulator pilot air inlet to cause movement of said regulator valve member.

9. A system according to claim 8 wherein in said standby control position said air pressure regulator means is constructed and arranged to deliver an outlet pressure to said control chamber of said inlet throttling valve means to shut off the flow of the air to said compressor inlet.

* * * * *